United States Patent [19]

Wright

[11] 3,757,098

[45] Sept. 4, 1973

[54] CARRY GENERATION MEANS FOR MULTIPLE CHARACTER ADDER

[75] Inventor: Carl Macey Wright, Cinnaminson, N.J.

[73] Assignee: RCA Corporation, Princeton, N.J.

[22] Filed: May 12, 1972

[21] Appl. No.: 252,589

[52] U.S. Cl. .................................. 235/175, 235/173

[51] Int. Cl. ............................................ G06f 7/385

[58] Field of Search .................... 235/175, 172, 173, 235/168

[56] References Cited

UNITED STATES PATENTS

| | | | |
|---|---|---|---|
| 3,506,817 | 4/1970 | Winder | 235/175 X |
| 3,535,502 | 10/1970 | Clapper | 235/175 X |
| 3,586,845 | 6/1971 | Komamiya | 235/175 X |
| 3,566,098 | 2/1971 | Kono | 235/175 |

*Primary Examiner*—Felix D. Gruber
*Assistant Examiner*—James F. Gottman
*Attorney*—H. Christoffersen, C. V. Olson and Samuel Cohen

[57] ABSTRACT

An addition stage of a binary multiple character adder is receptive to input signals, including operand bits from each of the characters and carry-in bits from previous lower order stages. The outputs include the sum for that stage and carry-out signals to succeeding higher order stages. Means are provided for determining the pattern of the input signals and for generating at least one carry-out signal from another carry-out signal in accordance with the input pattern.

9 Claims, 3 Drawing Figures

| No. of INPUT 1's | Si | Ki+1 | Ki+2 | Ki+3 |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

CARRY GENERATION MEANS FOR MULTIPLE CHARACTER ADDER

BACKGROUND OF THE INVENTION

Multiple character adders have application in the field of digital computers whenever it is desired to add multiple sets of ordered or weighted bits together in one pass. For instance, in a double step multiplier, the partial product is formed by adding the multiplicand to th partial product (which is initial zero) a number of times depending on the multiplier digit. A three character adder can perform the two necessary additions in one operation.

When two binary characters are added, bit by bit, in stages of a two character adder, the presence of two binary "1's" will generate a carry-out signal that is a binary 1 which must be added together with the next succeeding higher order bits in the next succeeding higher order addition stage. Therefore, each stage of a two character adder must have provisions for summing three bits and providing a carry-out to the next succeeding higher order addition stage. In the addition of three characters, bit by bit, in stages of a three character adder, each stage must accomodate five input bits, comprising three operand bits, a lower order carry-in from the next previous lower order stage, and a higher order carry-in from the second previous lower order stage, and must generate the sum of the five bits, a lower order carry-out to the next succeeding higher order stage, and a higher order carry-out to the second succeeding higher order stage. As the number of characters to be added together increases, the number of carry-out signals which must be generated also increases.

The sum of the binary inputs to an addition stage of a multiple character adder may be derived by a parity checker and is well known in the art. The carry-out signals can be independently derived by any one of various logic configurations. This invention relates to the generation of one carry-out signal from another carry-out signal.

SUMMARY OF THE INVENTION

An improved multiple character adder in which the input signals to an adder stage are examined and at least one carry-out signal is generated from another carry-out signal in a manner dependent on the input signal pattern which is present.

BRIEF DESCRIPTION OF THE DIAGRAMS

DETAILED DESCRIPTION OF THE DRAWING

Figures 1, 3:
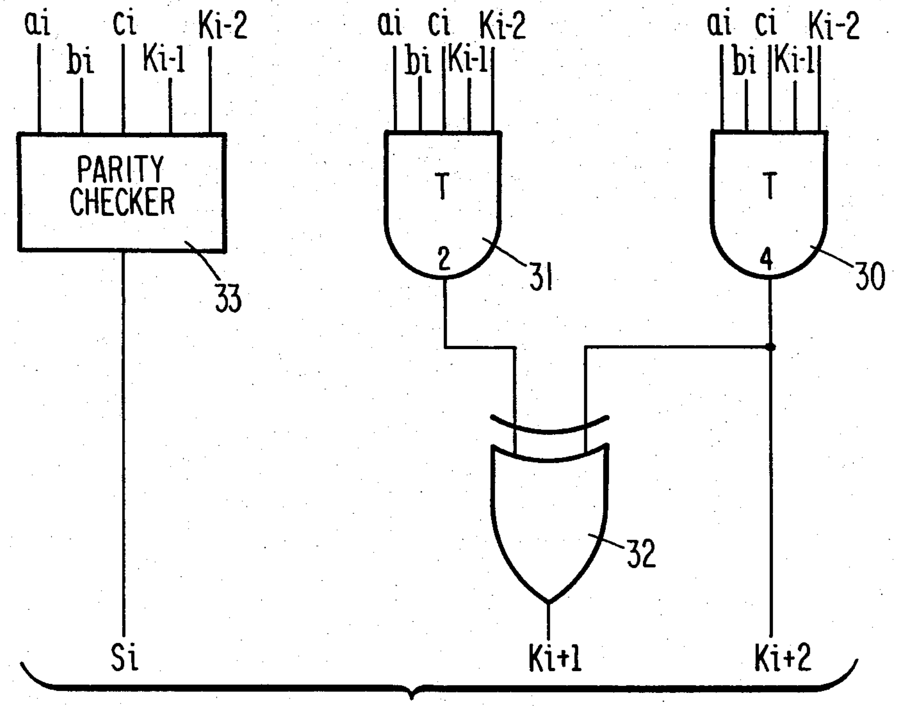
FIG. 1 is the truth table for the binary addition of bits containing up to fifteen binary 1's.
FIG. 3 is a schematic diagram of an addition stage of a three character adder using "threshold" logic gates and embodying the invention.

FIG. 1 is the truth table for the binary addition of groups of bits containing up to 15 binary 1's. The columns are labeled Number of Input 1's, $S_iK_{i+1}$, $K_{i+2}$, and $K_{i+3}$. the columne labeled Number of Input 1's contains, in increasing order, the number of binary 1's that may be present at any one time among the inputs to the $i^{th}$ addition stage of a multiple character adder. The $i^{th}$ stage is a typical addition stage of the multiple character adder. The input signals to an addition stage comprise the operand bits for that stage and carry-in bits from previous lower order stages. The carry-in bits from previous lower order stages are, of course, the carry-out bits of those stages. $S_i$ is the binary sum of the inputs to the $i^{th}$ stage. $K_{i+1}$, $K_{i+2}$, and $K_{i+3}$ are the carry-out signals which must be generated by the $i^{th}$ stage, depending on the number of characters to be added, and are, respectively, the carry-out to the next succeeding higher order stage, the carry-out to the second succeeding higher order stage, and the carry-out to the third succeeding higher order stage. If two characters are added, provisions must be made to generate and transmit the carry-out signals $K_{i+1}$ to the next succeeding higher order stage. If three characters are added, provisions must be made to generate and transmit the carry-out signals $K_{i+1}$ and $K_{i+2}$ to the next two succeeding higher order stages, respectively. If six characters are added, provisions must be made to generate and transmit the carry-out signals $K_{i+2}$, $K_{i+2}$, and $K_{i+3}$, to the next three succeeding higher order stages, respectively. The truth table in FIG. 1 can be easily verified by adding any number of binary 1's up to fifteen and looking at the sum digit, which is the least significant or rightmost digit of the result, the $K_{i+1}$ digit, which is the digit to the left of the sum digit, the $K_{i+2}$ digit, which is the digit to the left of the $K_{i+1}$ digit, and the $K_{i+3}$ digit, which is the digit to the left of the $K_{i+2}$ digit.

Certain relationships are present in FIG. 1. The sum digit for a stage, $S_i$, is a 1 when the number of input 1's is odd and is otherwise a 0. There are certain input patterns for which one carry-out signal is the complement of another. For instance, if the number of input 1's is in the range between 2 and 5, inclusive, or in the range between 10 and 13, inclusive, the carry-out signals $K_{i+1}$ and $K_{i+2}$ are complements of one another, and, for all other numbers of input 1's in FIG. 1 they are the same. The complementary relationship between $K_{i+1}$ and $K_{i+2}$ is indicated by dashed lines *5a* and *5b*. Dashed lines *6a*, *6b*, and *6c* indicate the complementary relationship between $K_{i+1}$ and $K_{i+3}$ when the number of input 1's is in the range between 2 and 3, inclusive, in the range between 6 and 9, inclusive, and in the range between 12 and 13, inclusive. Dashed line 7 indicates that carry-out signals $K_{i+2}$ and $K_{i+3}$ are complements in the range of number of input 1's between 4 and 11, inclusive. It is to be noted that if the truth table in FIG. 1 were extended for higher numbers of input 1's beyond 15, the complementary relationships between carry-out signals indicated by the dashed lines *5a*, *5b*, *6a*, *6b*, *6c*, and 7 would repeat every time another carry-out signal was generated. For instance, if it were possible to have 16 input 1's, a carryout, $K_{i+4}$, to the fourth succeeding higher order stage after the present would have to be generated. At 32 input 1's, a carry-out, $K_{i+5}$, to the fifth succeeding higher order stage after the present would have to be generated. Between sixteen input 1's and 32 input 1's the relationships between $K_{i+1}$, $K_{i+2}$, and $K_{i+3}$ is exactly the same as it is between zero input 1's and 15 input 1' s.

The area indicated by dashed line 8 is the truth table for the binary addition performed in an addition stage of a three character adder. As was just described, the lower order carry-out (carry-out to the next succeeding higher order stage), $K_{i+1}$, and the higher order carry-out (carry-out to the second succeeding higher order stage), $K_{i+2}$, are complements in the range of input 1's between 2 and 5, inclusive. Viewed in another way, the lower order carry-out, $K_{i+1}$, is the complement of the higher order carry-out, $K_{i+2}$, whenever the number of input 1's is greater than one and is otherwise the same as the higher order carry-out, $K_{i+2}$. Although the following description relates to two circuits for generating the lower order carry-out from the higher order carry-out in a three character adder utilizing this relationship, it should be noted that the higher order carry-out could be generated from the lower order carry-out. It is evident that the technique of generating one carry-out from another carry-out in accordance to what input pattern is present, is generally useful in any multiple character adder.

Figure 2:
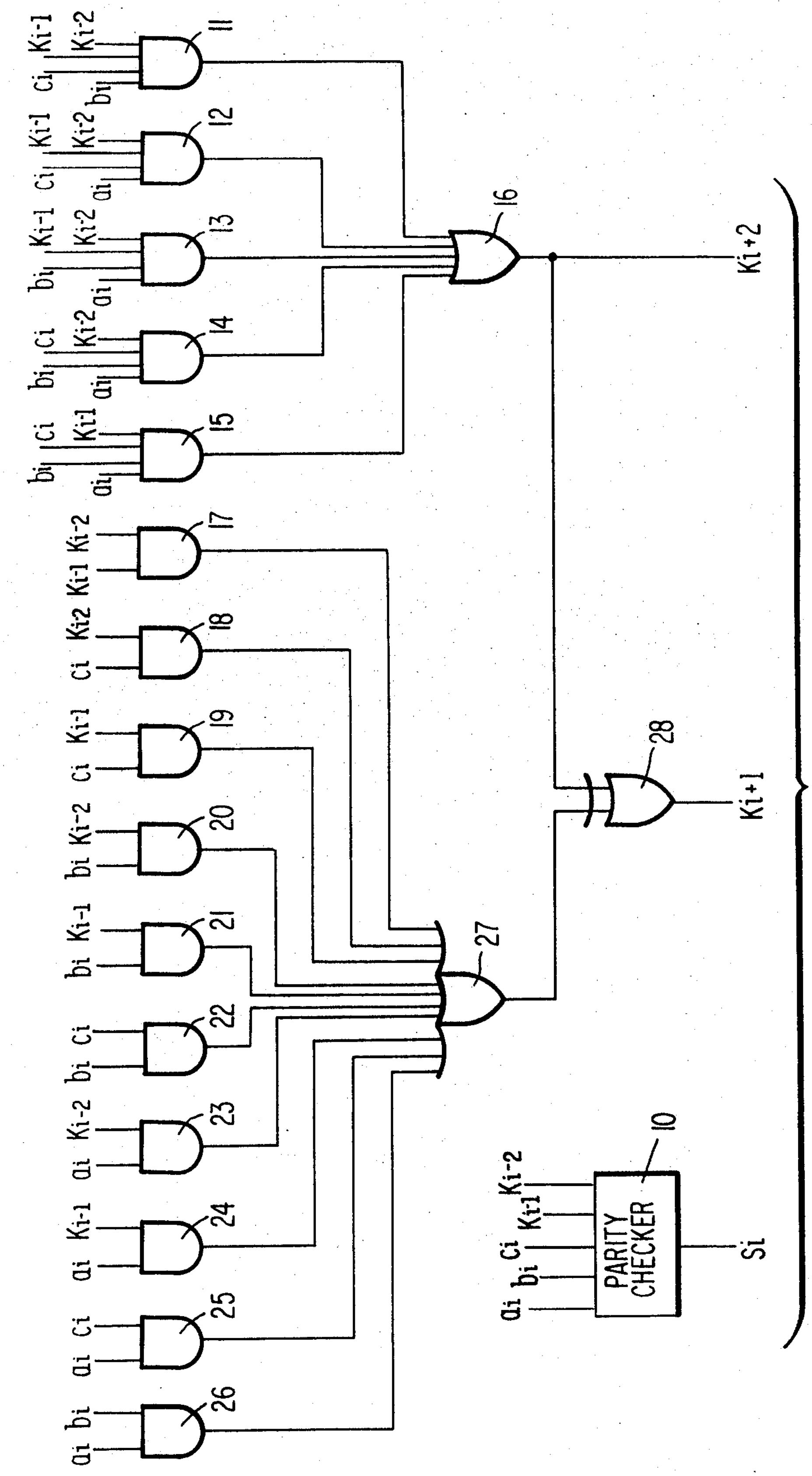
FIG. 2 is a schematic diagram of an addition stage of a three character adder using AND or OR gates and embodying the invention.

FIG. 2 is a schematic of the $i^{th}$ addition stage of a three character adder using AND or OR gates. The inputs to the stage are labeled $a_i$, $b_i$, $c_i$, $K_{i-1}$, and $K_{i-2}$and are respectfully the three digits from the $i^{th}$ order bit positions of three operand characters *a*, *b*, and *c*, the lower order carry-in signal from the next previous lower order stage, and the higher order carry-in signal from the second previous lower order stage. Herein, for purposes of convenience, the terms "signal" and "digit" are used interchangeably. The lower order carry-in signal, $K_{i-1}$, is the lower order carry-out signal from the next previous lower order stage and the higher order carry-in signal, $K_{i-2}$, is the higher order carry-out signal from the second previous lower order stage. The outputs are labeled $S_i$, $K_{i+1}$, and $K_{i+2}$ and are respectively the sum digit of the $i^{th}$ addition stage, the lower order carryout digit and the higher order carry-out digit of the $i^{th}$ addition stage.

Parity checker 10 receives the five inputs and produces the sum, $S_i$, which is a binary 1 solely when the number of binary 1 inputs is odd.

AND gates 11 through 15 and OR gate 16 form the logic network to generate the higher order carry-out signal, $K_{i+2}$. Each of the AND gates 11 through 15 receives a different combination of four of the five input signals. The output of each AND gate 11 through 15 is connected to an input terminal of OR gate 16. The output of OR gate 16 is the higher order carry $K_{i+2}$.

AND gates 17 through 26, OR gate 27, and "exclusive OR" gate 28, when used in conjunction with the higher order carry-out, $K_{i+2}$, produce the lower order carry-out $K_{i+1}$. Each of the AND gates 17 through 26 receives a different combination of two of the five input signals. OR gate 27 has provisions to receive the 10 outputs of AND gates 17 through 26. The outputs of OR gate 16 and OR gate 27 are connected to the two input terminals of exclusive OR gate 28. It will be remembered that the Boolean expression for an "exclusive OR" gate is $$X = Y\bar{Z} + \bar{Y}Z$$

where $X$ is the output of the exclusive OR gate and $Y$ and Z are both inputs to the exclusive OR gate. The bar over $Z$ and $Y$ is the notation for "complement of". The output of exclusive OR gate 28 is the lower order carry-out signal, $K_{i+1}$.

An example is beneficial in understanding the operation of the circuit in FIG. 2. Suppose that $a_i$, $b_i$, $c_i$, and $K_{i-1}$ is each a 1 and $K_{i-2}$ is a 0. The number of input 1's is four, an even number, and the output $S_i$ of parity checker 10 is a 0. All four inputs of AND gate 15 and 1's and the output is correspondingly a 1. Therefore, the output $K_{i+2}$ of OR gate 16 is also a 1. Both inputs of AND gates 19, 21, 22, 24, 25, and 26 are 1's and their outputs are accordingly 1's. Correspondingly, the output of OR gate 27 is at 1. This means that the two inputs to exclusive OR gate 28 are both 1's. The output $K_{i+1}$ of exclusive OR gate, in accordance to the above equation, is a 0. It will be seen from FIG. 1 that when only four of the five inputs are 1's, the higher order carry-out, $K_{i+2}$, is a 1 the lower order carry-out, $K_{i+1}$, is a 0, and the sum $S_i$, is a 0. This is the same result as was just obtained in the example.

As another example, consider the case in which only $a_i$ is a 1. Since the number of input 1's is odd, the sum, $S_i$, is a 1. The output of each AND gate 11 through 15 is a 0 because each of these AND gates produces a 1 at its output only when all four of the inputs to that gate are 1's. Correspondingly, the output $K_{i+2}$ of OR gate 16 is a 0. The output of each AND gate 17 through 26 is a 0 because each of these AND gates produces a 1 at its output only when both the two inputs to that gate are 1's. Correspondingly, the output of OR gate 27 is a 0. Since both inputs to exclusive OR gate 28 are 0's, its output, $K_{i+1}$, is also a 0 in accordance with the exclusive OR equation given above. Looking at FIG. 1, it may be seen that when only one input 1 to the adder stage is present the sum, $S_i$, is a 1 and the lower order carry-out, $K_{i+1}$, and the higher order carry-out, $K_{i+2}$, are both 0's.

FIG. 3 is a schematic diagram of the $i^{th}$ addition stage of a three character adder using "threshold" logic. The same input and output signals are present here as were present in FIG. 2. The threshold gates utilized here will produce a binary 1 at their output whenever at least the threshold number of binary 1's are among their inputs. Threshold gate 30 has a threshold of four and will produce a 1 at its output whenever at least four of the five inputs to it are 1's. Threshold gate 30 is receptive to all of the five input signals. The output of threshold gate 30 is the higher order carry-out, $K_{i+2}$.

Threshold gate 31 has a threshold of two. Threshold gate 31 is receptive to all five of the inputs. Whenever at least two of the five inputs are 1's, the output of threshold gate 31 is a binary 1. The outputs of both threshold gates 30 and 31 are connected to the input terminals of exclusive OR gate 32. The output of exclusive OR gate 32 is the lower order carry-out, $K_{i+1}$.

Parity checker 33 is receptive to all five input signals and generates a 1 solely when the number of input 1's is odd.

Again taking the example where $a_i$, $b_i$, $c_i$, and $K_{i-1}$, is each a 1 and $K_{i-2}$ is a o, the number of input 1's is four, an even number, and the output $S_i$ of parity checker 33 is a 0. The output $K_{i+2}$ of threshold gate 30 is a 1 since the threshold number of this gate is four and there are four input 1's present. The output of threshold gate 31 is also a 1 since the threshold number of this gate is 2. Since the two inputs to exclusive OR gate 32 are both 1's, the output, $K_{i+1}$, is a 0. These results are in accord with FIG. 1 when the number of input 1 is four.

Again taking the example where only $a_i$ is a 1, the number of input 1's is one, an odd number, and the output $S_i$ of parity checker 33 is a 1. Since one is below the threshold numbers of both threshold gates 30 and 31, the outputs of both gates are 0's. Thus, the higher order carry-out signal, $K_{i+2}$ is a 0. Since the two inputs to exclusive OR gate 32 are both 0's, the output, $K_{i+1}$, is a 0. These results are in accord with FIG. 1 when the number of input 1's is one.

Thus, circuits shown in FIG. 1 and FIG. 2 operate in accordance with the truth table of a three character adder stage indicated by dashed line 8 in FIG. 1. The sum, $S_i$, for an addition stage of a three character adder is a binary 1 solely whenever the number of input 1's is odd. The higher order carry-out signal, $K_{i+2}$, is a binary 1 whenever the number of input 1's is at least four. The lower order carry-out signal, $K_{i+1}$, is the complement of the higher order carry-out signal, $K_{i+2}$, whenever the number of input 1's is at least two, and is the same as the higher order carry-out signal otherwise.

What is claimed is:

1. In a stage of a binary adder responsive to input signals comprising the operand signals for that stage and the carry-in signals from previous lower order stages and producing the sum for that stage and a first carry-out signal for a succeeding higher-order stage, the combination comprising:

a pattern recognition means responsive to the input signals for producing a control signal when the input signals conform to certain predetermined patterns, and means responsive to the first carry-out signal and said control signal for producing a second carry-out signal from the first carry-out signal in accordance with said control signal.

2. The combination as recited in claim 1 wherein the second carry-out signal producing means complements the first carry-out signal whenever said control signal is in a first of two states and otherwise produces a second carry-out signal which is the same as the first carry-out signal.

3. The combination as recited in claim 2 wherein second carry-out signal producing means includes an exclusive OR gate.

4. In a stage of a three character binary adder responsive to five input signals, comprising three operand signals, a lower order carrier-in signal from the next previous lower order stage, and a higher order carry-in signal from the second previous lower order stage; in combination means for generating the sum for that stage;

means for generating a first carry-out signal for one of the next two succeeding higher order stages; and means for generating a second carry-out signal comprising means for complementing the first carry-out signal whenever the five input signals contain at least two binary 1's and otherwise making the second carry-out signal the same as the first carry-out signal.

5. The combination as recited in claim 4 wherein said means for generating the second carry-out signal includes:

a first logic means responsive to the five input signals for producing a binary 1 signal whenever the five input singals contain at least two binary 1's and a second logic means responsive to the output of said first logic means and the first carry-out signal for generating the complement of the higher carry-out signal whenever the output of said first logic circuit is a binary 1, and otherwise making the second carry-out signal the same as the first carry-out signal.

6. The combination as recited in claim 5, wherein said first logic means includes a threshold gate having a threshold of two.

7. The combination as recited in claim 5, wherein said second logic means is an exclusive OR gate.

8. In a stage of a three character binary adder responsive to five input signals, comprising three operand signals, a lower order carry-in signal from the next previous lower order stage, and a higher order carry-in signal from the second previous lower order stage and generating the sum for that stage and a higher order carry-out signal for the second succeeding higher order stage, the combination comprising:

a network of AND and OR gates responsive to the five input signals for producing a binary 1 output whenever the five input signals contain at least two binary 1's, and an exclusive OR gate responsive to the output of said network and to the higher order carry-out signal for producing a lower order carry-out signal for the next succeeding higher order stage.

9. In a stage of a three character binary adder responsive to five input signals. comprising three operand signals, a lower order carry-in signal from the next previous lower order stage, and a higher order carry-in signal from the second previous lower order stage, and generating the sum for that stage and a higher order carry-out for the second next higher order stage, the combination comprising:

a threshold gate responsive to the five input signals and having a threshold of two for producing a binary 1 output whenever the five input signals contain at least two binary 1's, and an exclusive OR gate responsive to the output of said threshold gate and to the higher order carry-out signal for producing a lower order carry-out signal to the next succeeding higher order stage.

* * * * *